United States Patent Office 3,137,711
Patented June 16, 1964

---

3,137,711
SYNTHESIS OF 5-CHLORO-2,4-BIS(METHYL-SULFAMYL)-ANILINE
Warren James Close, Waukegan, Ill., assignor to Abbott Laboratories, North Chicago, Ill., a corporation of Illinois
No Drawing. Filed July 28, 1961, Ser. No. 127,511
1 Claim. (Cl. 260—397.7)

This invention relates to a novel method for the manufacture of 5-chloro-2,4-bis(methylsulfamyl)-aniline having the formula

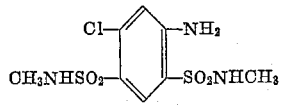

which is an important intermediate for the manufacture of the diuretic and antihypertensive agent 2-methyl-3-chloromethyl-6-chloro-7-sulfamyl-3,4-dihydro-1,2,4 - benzothiadiazine-1,1-dioxide. In such use, the aniline compound is refluxed with methyl dimethoxyacetate in water solution to produce 3-carboxy-6-chloro-2-methyl-7-methylsulfamyl-3,4-dihydro-1,2,4 - benzothiadiazine - 1,1 - dioxide which is then reacted as described in my copending application U.S. Serial No. 47,915, filed on August 8, 1960, now U.S. Patent 3,052,695, according to the following series of reactions:

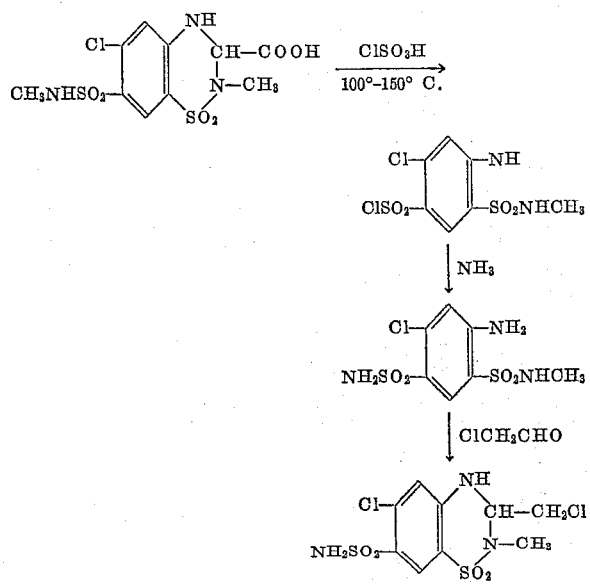

The classical method for preparing 5-chloro-2,4-bis(methylsulfamyl)-aniline is to react meta-chloroaniline with chlorosulfonic acid to obtain 5-chloroaniline-2,4-disulfonyl chloride which is thereafter reacted with methylamine to obtain the desired product.

It has now been discovered that good yields of 5-chloro-2,4-bis(methylsulfamyl)-aniline can be obtained by the reaction of 4,6-dichloro-1,3-bis(methylsulfamyl)-benzene with benzylamine to obtain the novel intermediate 5-chloro-2,4-bis(methylsulfamyl)-N-benzylaniline of the formula

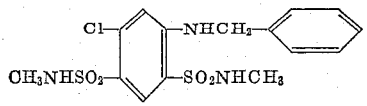

which when hydrogenated in the presence of a palladium catalyst will produce the desired product directly. The following example illustrates a specific embodiment of the invention but is not to be construed as limiting.

*Example 1*

4,6-dichloro-1,3-bis(methylsulfamyl)-benzene (3.33 g., 0.01 mole) prepared as described in the Journal of Pharmacy and Pharmacology, 12, 497 (1960) and 2.15 g. (0.02 mole) of benzylamine were dissolved in diethyleneglycol dimethyl ether and refluxed for 2 hours. The benzylamine hydrochloride which precipitated during the reaction was removed by filtration and the solvent thereafter removed from the filtrate by distillation. The residue was recrystallized from methanol-water to obtain the desired 5-chloro-2,4-bis(methylsulfamyl)-N-benzylaniline compound melting at 189°–191° C. which upon analysis was found to contain 10.8% nitrogen compared to the calculated value of 10.4% nitrogen.

In the second step of the reaction, 3 grams of 5-chloro-2,4-bis(methylsulfamyl)-N-benzylaniline were dissolved in alcohol and hydrogenated at from 2 to 3 atmospheres pressure in the presence of a palladium catalyst. When the reaction was complete, the catalyst was removed by filtration and the filtrate concentrated under reduced pressure. The residue was treated with water and the solid which remained was separated by filtration to obtain the desired 5-chloro-2,4-bis(methylsulfamyl)-aniline melting at 175°–176° C.

What is claimed is:
5-chloro-2,4-bis(methylsulfamyl)-N-benzylaniline.

References Cited in the file of this patent
UNITED STATES PATENTS 2,358,465    McNally et al. _____ Sept. 19, 1944
2,506,224    Kopp et al. _____ May 2, 1950

FOREIGN PATENTS 564,006    Belgium _____ July 16, 1958

OTHER REFERENCES

Birkofer: Deutsche Chemische Gesellschaft Berichte, vol. 78B, pages 429–41 (page 439) (1942).
Dahn et al.: Helv. Chim. Acta, vol. 35, pages 1162–8, 1348–58 (1952).
Mitsui et al.: Chemical Abstracts, vol. 49, page 10210f (1955).
Bourdois et al.: Bull. Soc. Chim. of France, 1961, pages 550–53.
Derwent: Belgian Patent Report, vol. 1, No. 1, published May 1–15, 1961, page C4, column 1, citing Belgian Patent 596,826, May 8, 1961.
Whitehead et al.: J. Org. Chem., volume 27, No. 3, pages 951–956 (1962).